(No Model.)  2 Sheets—Sheet 1.
D. M. HOLMES.
CAKE COATING MACHINE.
No. 493,403.  Patented Mar. 14, 1893.
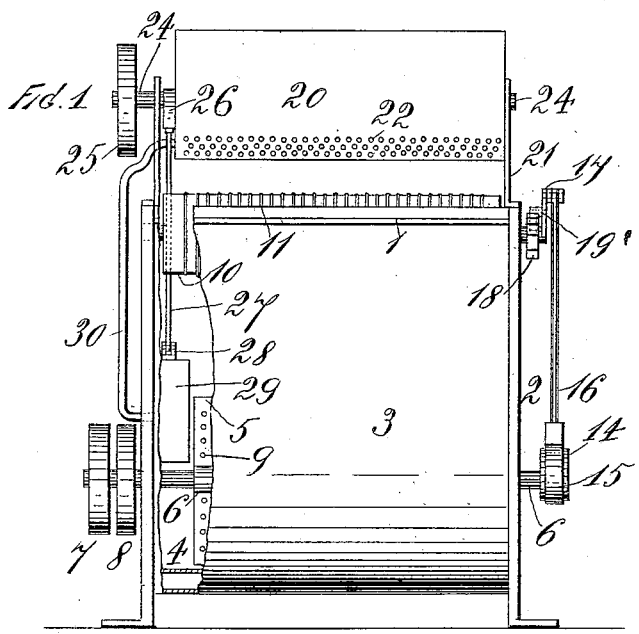
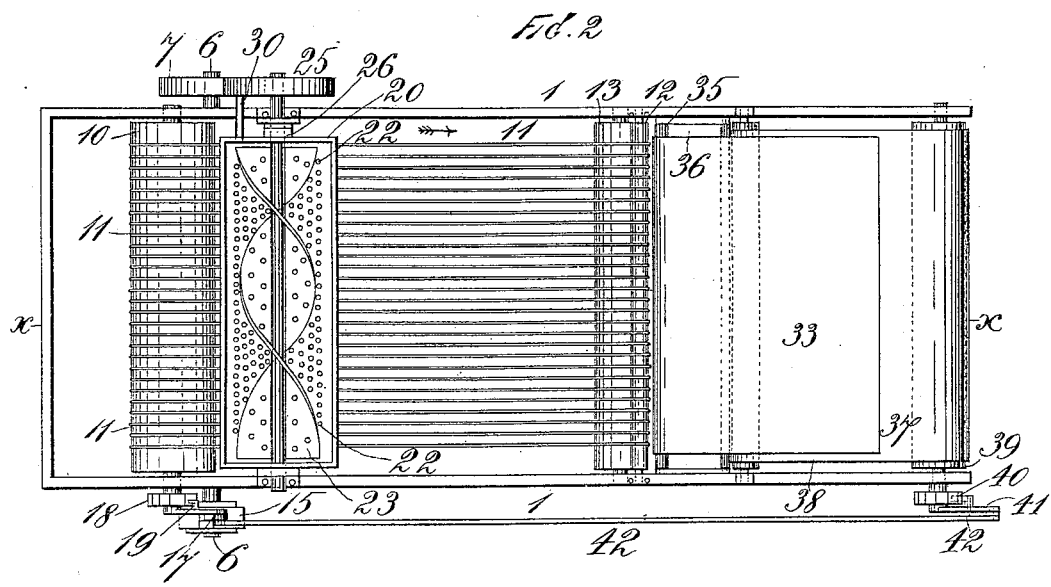
WITNESSES:
John Buckler,
Isabel Chester.
INVENTOR
Daniel M. Holmes.
BY A. M. Pierce,
ATTORNEY.

(No Model.) 2 Sheets—Sheet 2.

D. M. HOLMES.
CAKE COATING MACHINE.

No. 493,403. Patented Mar. 14, 1893.

WITNESSES:
John Buckler,
Isabel Chester.

INVENTOR
Daniel M. Holmes,
BY A. M. Pierce,
ATTORNEY.

UNITED STATES PATENT OFFICE.

DANIEL M. HOLMES, OF ARLINGTON, NEW JERSEY, ASSIGNOR TO JOHN R. VAN DERVER, OF NEW YORK, N. Y.

CAKE-COATING MACHINE.

SPECIFICATION forming part of Letters Patent No. 493,403, dated March 14, 1893.

Application filed October 17, 1892. Serial No. 449,086. (No model.)

*To all whom it may concern:*

Be it known that I, DANIEL M. HOLMES, a citizen of the United States, residing at Arlington, in the county of Hudson and State of New Jersey, have invented a new and useful Improvement in Cake-Coating Machines, of which the following is a specification.

My invention relates especially to mechanism employed for coating cakes and equivalent articles with chocolate &c., and has for its object the provision of a simple and effective machine whereby soft and fragile cakes or other goods may be coated in a simple and effective manner without danger of breaking or injuring the cake.

To attain the desired end, my invention consists essentially in certain novel and useful combinations or arrangements of parts, and peculiarities of construction and operation, all of which will be hereinafter first fully described, and then pointed out in the claims.

Figure 3:
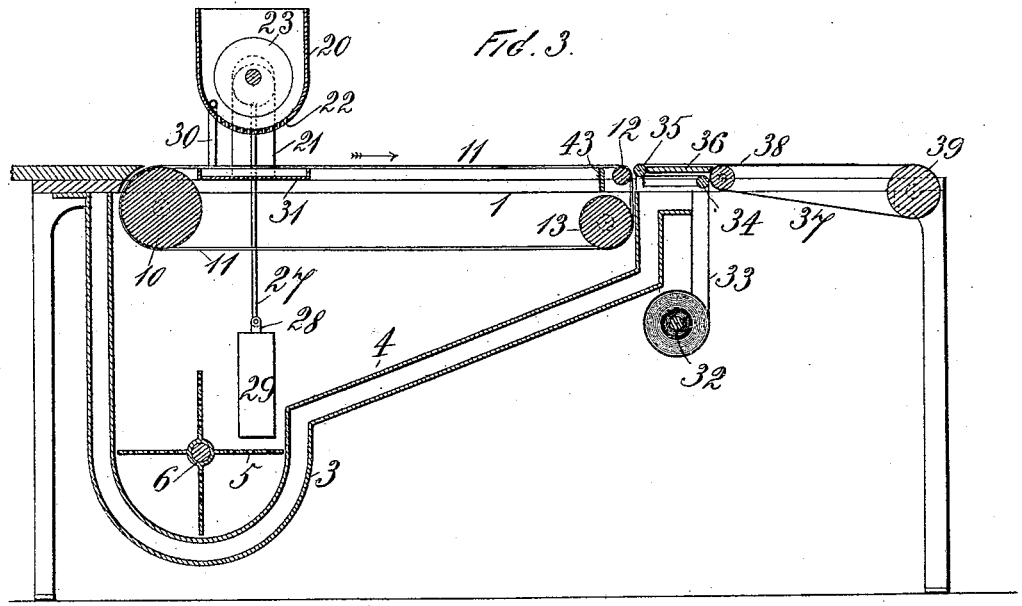
Figure 4:
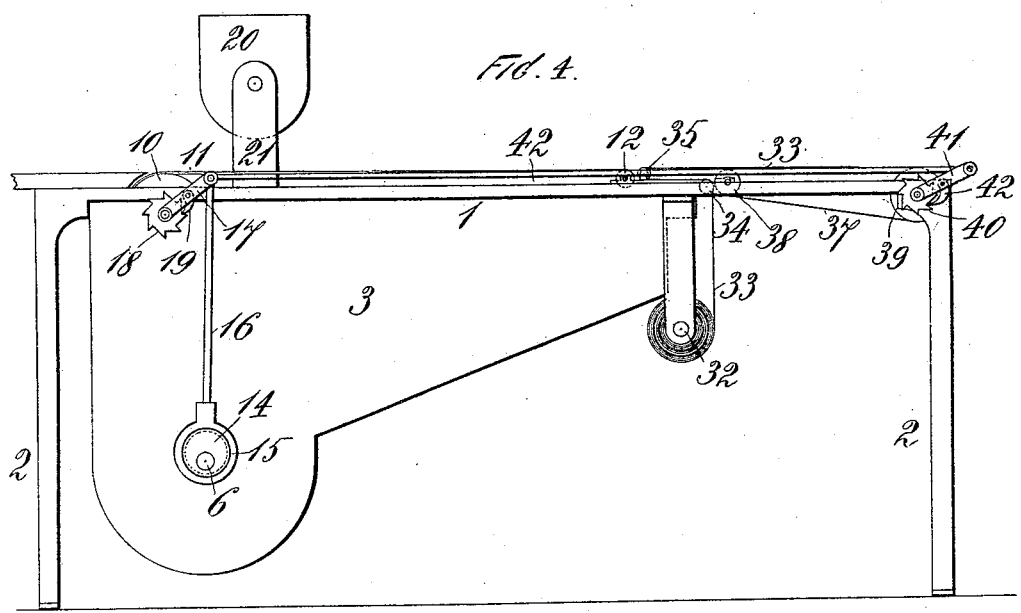

In the accompanying drawings, Figure 1 is a front elevation of my coating machine. Fig. 2 is a plan view thereof. Fig. 3 is a vertical, longitudinal, sectional view at line $x$—$x$ of Fig. 2. Fig. 4 is a side elevation.

Like numerals of reference, wherever they occur, indicate corresponding parts in all the figures.

1 is the main frame, supported upon legs 2.

3 is a tank supported by and beneath the main frame, and arranged to contain water to be heated in any desired manner.

4 is a tank for containing the coating material, supported within the tank 3.

5 is an agitator, mounted upon a shaft 6 extending through the tanks 3 and 4, said shaft bearing at one end a driving pulley 7, and a second pulley 8. I have found by experience that by making such agitator of perforated material, it is much more effective in operation, and keeps the coating material free from lumps; prevents rapid cooling, and gives the finished goods a much better and finer appearance. I therefore perforate said agitator, as at 9.

10 is a drum, mounted at the top of the coating tank 4, and provided with circumferential grooves, for the reception of wires or bands 11. These wires pass over the drum 10, around a small roller 12 mounted in bearings in the main frame, and then downward over a drum 13 in the coating tank, and back to the driving drum 10. The driving drum 10 is driven with an intermittent motion by means of an eccentric 14 mounted upon the shaft 6, said eccentric having a strap 15 to which is connected a rod 16, passing to an arm 17 pivoted on the shaft of the drum 10, which arm also bears a ratchet 18 with which a pawl 19 upon the arm 17 engages.

20 is a tank, mounted upon feet 21 supported upon the top of the main frame. The bottom of this tank is perforated as at 22. Within the tank 20 is a worm 23, made of perforated material, and mounted upon a shaft 24 which bears a driving pulley 25 designed to be connected by a band to the pulley 7. Upon the shaft 24 is an eccentric 26 designed to carry a strap engaging with a rod 27, pivoted to a piston 28 in a pump barrel 29, located in the coating tank.

30 is a pipe extending from the pump barrel to the showering tank, 20.

31 is a shallow pan, located beneath the showering tank in such a manner as to permit the wires 11 to pass thereover.

32 is a paper reel, mounted beneath the main frame, and 33 is the paper thereon. This paper is arranged to pass around a roller, 34, then around a second roller, 35, in close proximity to the roller 12, and then over a plate 36.

37 is a band or belt passing over a roller 38, and then around a driving drum 39 mounted in the main frame. The shaft of drum 39 bears a ratchet 40.

41 is an arm also pivoted upon said shaft, and bearing a pawl 42.

43 is a rod which connects the two arms 17 and 41. By this arrangement, the two drums 10 and 39 are driven with a uniform speed, and consequently as goods pass from the wires 11, as will be hereinafter described, the paper upon which they are deposited will move at exactly the same rate as the delivery wires.

When constructed and arranged in accordance with the foregoing description, the operation of my coating machine is as follows: The tank 4 being supplied with coating material, and kept at the proper temperature, cakes, or other goods to be coated, are placed in rows upon the wires 11 at the front of the machine. Power is now applied through the medium of the pulley 7, and the pump supplies melted coated material to the tank 20. The movement of the perforated screw therein thoroughly churns said material, and at the same time carries it along the bottom of the tank 20, forcing it in streams through the perforations therein, it falls upon the cakes as they pass therebeneath, the surplus material flows from the cakes into the pan 31, and after that becomes filled, it will flow back into the tank 4. As the successive rows of cakes are carried beneath the showering tank, the bottoms are scraped by the edge of the pan 31, removing a portion of the adhering coating, and they continue to drain until they reach a final bottom scraping bar, 43, and then they pass to the paper 33, and are carried along the band 37, to be removed together with their supporting paper.

Having now fully described my invention, what I claim as new therein, and desire to secure by Letters Patent, is—

1. A coating machine in which is comprised a tank for holding the coating material; a pump connected therewith; a showering tank; carrying mechanism passing beneath the showering tank; a pan supported beneath said tank; and a paper arranged to move in unison with the carrying mechanism, substantially as shown and described.

2. In a machine of the character herein specified, the combination with a tank for holding coating material of a perforated agitator mounted within said tank, and arranged to operate, substantially as shown and described.

3. In a machine of the character herein specified, the combination with a showering tank having a perforated bottom, of a worm made of perforated material, mounted within said tank, and arranged to agitate and move the coating material, substantially as shown and described.

4. In a machine of the character herein specified, the combination with the carrying mechanism, of a pan arranged to hold coating material, over which the carrying mechanism passes, and a continuous showering device located above the carrying mechanism, substantially as shown and described.

5. In a machine of the character herein specified, a showering tank, in combination with cake carrying mechanism, and means for removing surplus coating material, substantially as shown and described.

6. In a machine of the character herein specified, the combination with a showering device, and cake carrying mechanism, of a paper reel; a paper supporting belt, and means whereby the cake carrying mechanism, paper, and paper supporting belt are caused to move in unison, substantially as shown and described.

7. In a machine of the character herein specified, the combination with a continuous showering device, of a series of wires forming a support for the goods to be coated and arranged to carry said goods beneath the showering device, substantially as shown and described.

DANIEL M. HOLMES.

Witnesses:
A. M. PIERCE,
ISABEL CHESTER.